(12) United States Patent
Holland et al.

(10) Patent No.: US 6,618,945 B2
(45) Date of Patent: Sep. 16, 2003

(54) MICROCABLE STRIPPING TOOL

(75) Inventors: Michael Holland, Santa Barbara, CA (US); Shen Chia Wong, Taipei (TW)

(73) Assignee: Holland Electronics, LLC, Ventura, CA (US)

( * ) Notice: Subject to any disclaimer, the term of this patent is extended or adjusted under 35 U.S.C. 154(b) by 0 days.

(21) Appl. No.: 10/028,639

(22) Filed: Dec. 19, 2001

(65) Prior Publication Data

US 2003/0110635 A1 Jun. 19, 2003

(51) Int. Cl.[7] .................................................. H02G 1/12
(52) U.S. Cl. .............................. 30/90.1; 81/9.4; 81/9.41
(58) Field of Search ................................ 30/90.1, 90.2; 81/9.4, 9.41, 9.44, 9.42, 9.43

(56) References Cited

U.S. PATENT DOCUMENTS

| | | | | |
|---|---|---|---|---|
| 4,203,333 A | * | 5/1980 | Campari | 30/90.1 |
| 4,449,298 A | * | 5/1984 | Putz | 30/90.1 |
| 4,559,704 A | * | 12/1985 | Michael, III | 30/90.1 |
| 4,638,692 A | * | 1/1987 | Bensussen et al. | 81/9.41 |
| 4,934,219 A | * | 6/1990 | Edwards | 81/9.44 |
| 4,953,428 A | * | 9/1990 | Commes | 81/9.4 |
| 5,956,789 A | * | 9/1999 | Chou | 81/9.4 |
| 6,530,152 B1 | * | 3/2003 | Christensen et al. | 30/90.1 |

* cited by examiner

Primary Examiner—Hwei-Siu Payer
(74) Attorney, Agent, or Firm—Michael G. Petit

(57) ABSTRACT

A tool for stripping a microcoaxial cable having an outside diameter of four millimeters or less. The tool is operable for precisely stripping the jacket, shield and dielectric layers of the microcoaxial cable under field conditions. The tool comprises a fixed gripping portion that holds and supports the cable both proximal and distal to the portion to be stripped. A blade portion rotatably mounted to the fixed gripping portion has a double action. When the blade portion is depressed, a plurality of blades mounted thereon cuts into the microcoaxial cable to precise and adjustable depths. A 360° rotation of the blade portion relative to the fixed gripping portion cleanly severs the respective layers of the cable. The respective severed layers of the cable are removed by hand to expose the underlying layer and the central conductor thereby providing a stripped portion of microcoaxial cable to which a microcoaxial cable connector can be attached. The tool includes a retractable cable guide on the distal side of the blades which supports an unstripped portion of the length of the microcoaxial cable adjacent the stripped portion during stripping. This further prevents the cable, or the layers comprising the cable, from rotating or flexing during the cutting process and provides a clean, perpendicular cut.

4 Claims, 5 Drawing Sheets

MICROCABLE STRIPPING TOOL

BACKGROUND OF THE INVENTION

1. Field of the Invention

The present invention relates to a tool for stripping a coaxial cable, and, more particularly, to a hand operable tool for stripping an end of a microcoaxial cable.

2. Prior Art

Flexible coaxial cable for telecommunications use ranges in size (outside diameter) from about 2–13 millimeters. In order to attach a connector to the end of such cables, it is customary, and presently necessary, to prepare the end of the cable prior to attachment. In accordance with current practice, a portion of the shielding layer, dielectric layer and central conductor of the cable are exposed, preferably in a single step, by a stripping tool. Most prior art stripping tools that are designed for field use, work in a manner similar to that of a tubing cutter wherein the entire tool rotates around the tube to be severed. In the cable stripping tool, the blades are spaced from one another by a fixed distance, each blade comprising the stripping tool being set to penetrate the stripped cable to a different and precise depth.

Although such prior art stripping tools have been used successfully for many years and perform well for their intended purpose when used to strip rigid coaxial cables having an outside diameter greater than 4 millimeters, they do not perform well with smaller diameter, less rigid cables having an outside diameter between 1.8–4 mm. When such prior art strippers are used to strip small diameter, less rigid cables, the resultant cut is unprecise for two reasons: (a) the cable is ususally secured with the cable installer's hands some distance from the rotating tool's cutting blades, resulting in the microcables' off-axis rotation as the circular force is applied some distance from the secure point which causes "wobbling" and an uneven cut depth; and (b) when the multiple blades are inserted into the cable at differing depths and then rotated, the resistance of the deep cutting blade becomes greater than the shallower cutting blades. This causes the cable to flex, or twist and rotate about an axis that is tilted with respect to the microcable's longitudinal axis during the cutting rotation, resulting in unequal cutting.

Advanced telecommunication applications require the bundling of 24 microcoaxial cables into a single cable having an OD less than one inch. Such bundled cables require the use of microcoaxial cables in order to satisfy size specification requirements. Since each cable comprising the bundle must have a terminal connector operable for providing electrical connection between the central conductor of the cable and a signal receiving device, the end of each cable must be prepared (i.e., stripped) in order to attach a prior art connector thereto. A tool operable for precisely stripping coaxial cable having an OD of 4 millimeters or less is needed.

SUMMARY

It is a primary object of the invention to provide a hand operable tool for precisely stripping a terminal end of a microcoaxial cable in preparation for attachment of the terminal end to a microcoaxial cable connector.

The above objective is met by providing a stripping tool operable for stripping one or more layers of material from an end of a microcoaxial cable having a plurality of concentric, coaxial layers of material and an outer diameter. The tool comprises an elongate, substantially cylindrical body having an axial bore coextensive with a length thereof. The diameter of the axial bore is slightly greater than the outer diameter of the microcoaxial cable, permitting the cable to be inserted therein and advanced therethrough. The elongate body comprises a substantially cylindrical gripping portion having a proximal end and a distal end. The gripping portion includes cable clamping means operable for releasably gripping the microcoaxial cable when the cable is disposed withn the axial bore. The tool further comprises a stripping portion rotatably mounted on the distal end of the gripping portion. The stripping portion includes at least one blade having a cutting edge mounted on the stripping portion that is reciprocally movable. Blade actuator means on the stripping portion extends the blade into the axial bore to a desired depth thereby cutting through layers of the cable to a desired depth. The stripping portion is then rotated through 360° to cleanly sever the desired layer or layers material connection with the cable. The cable is then removed from the axial bore. In one embodiment of the stripping tool, the stripping portion includes a retractable tubular sleeve at the distal end of the axial bore that keeps the cable on axis during cutting.

The features of the invention believed to be novel are set forth with particularity in the appended claims. However the invention itself, both as to organization and method of operation, together with further objects and advantages thereof may be best understood by reference to the following description taken in conjunction with the accompanying drawings in which:

BRIEF DESCRIPTION OF THE DRAWINGS

FIG. 4b is a perspective view of a partially assembled cable gripping portion of the microcable stripping tool of FIG. 4a.

DESCRIPTION OF THE PREFERRED EMBODIMENTS

A microcable stripping tool 100 in accordance with the present invention is shown in front perspective view in FIG.

Figure 1:
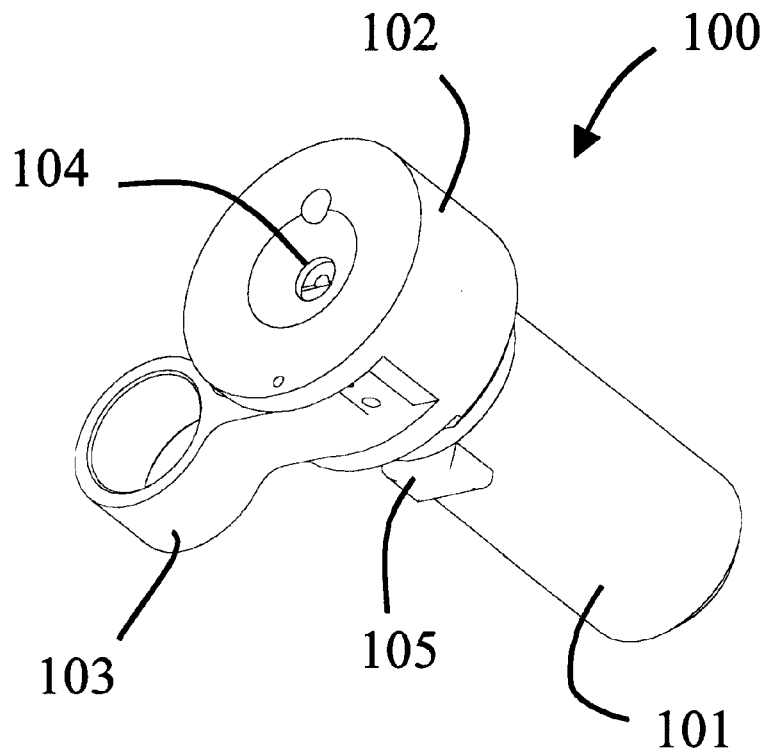
FIG. 1 is a front perspective view of a microcable stripping tool in accordance with a preferred embodiment of the present invention.
Figure 2:
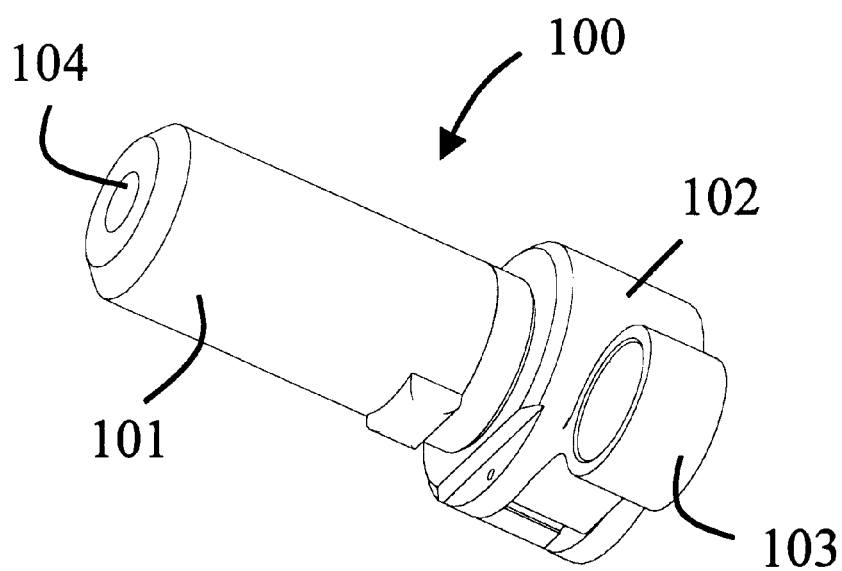
FIG. 2 is a rear perspective view of a microcable stripping tool in accordance with the preferred embodiment of the present invention shown in FIG. 1.

1 and rear perspective view in FIG. 2. The tool 100 comprises a gripping portion 101 having an axial bore 104 coextensive with the length thereof, and a stripping portion 102 rotatably mounted on a distal end of the gripping portion 101. The stripping portion 102 includes a manually actuated blade extender 103 operable for controlling the position of a stripping blade (not shown in FIGS. 1 and 2) relative to the axial bore 104 of the tool 100. The gripping portion 101 preferably has a cylindrical outer surface that is dimensioned to be held comfortably within the hand. In operation, a button 105 slidably disposed on the gripping portion 101 is depressed to retract a cable gripping member that extends into the axial bore and an end of a microcoaxial cable (not shown) is inserted into the rearward end of the axial bore 104 and advanced thereinto until the end of the cable is flush with the distal end of the axial bore 104, at which point the button 105 is released and a spring loaded clamping member comprising the gripping portion 101 clamps onto the cable to prevent movement of the cable within the axial bore.

Figure 7:
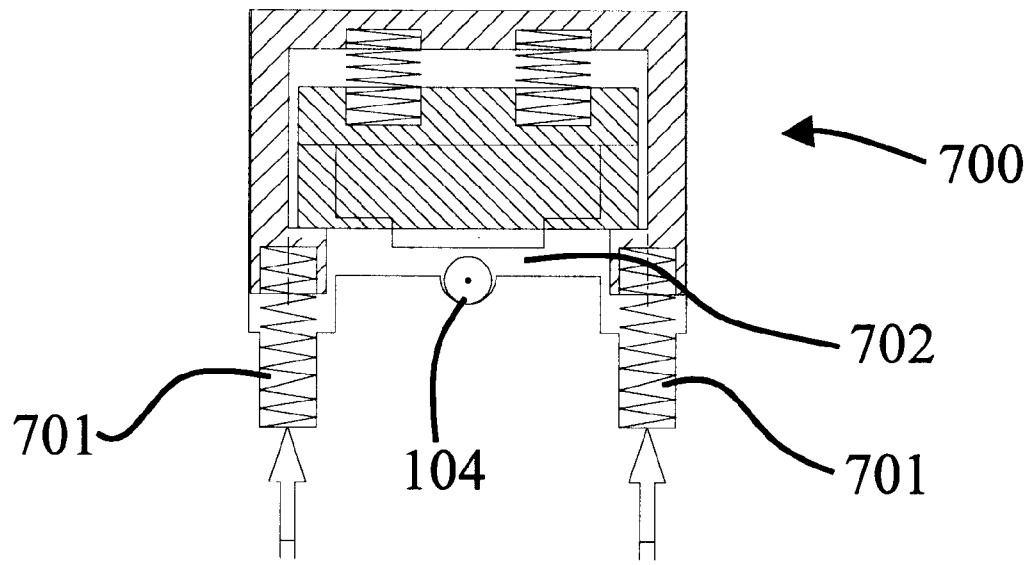
FIG. 7 is a cross-sectional view of a blade cartridge adapted to be mounted in the blade assembly ring as illustrated in FIG. 5.
Figure 8:
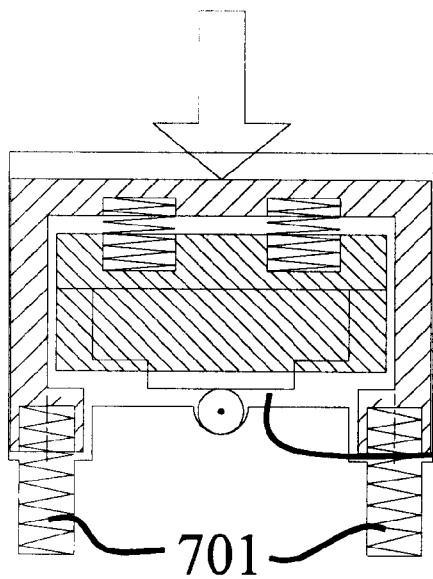
FIG. 8 is a cross-sectional view of the blade cartridge of FIG. 7 illustrating the extension of the blade(s) when the blade lever is partially depressed.
Figure 9:
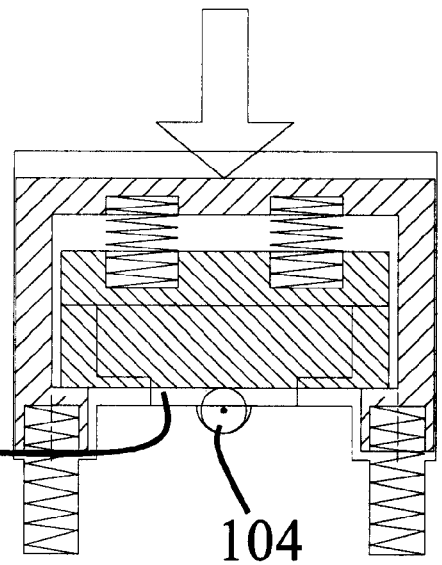
FIG. 9 is a cross-sectional view of the blade cartridge of FIG. 7 illustrating the extension of the blade(s) when the blade lever is fully depressed.

When the microcoaxial cable is disposed within the axial bore 104 as described above, one or more circular blades housed within the stripping portion 102 are extended into the axial bore to project thereinto to a predetermined depth sufficient to cut through a particular layer of the cable by depressing cam lever 103. When the microcoaxial cable is supported within the axial bore and the blade(s) 702 are extended to perforate a layer of the cable, as shown in FIG. 9, the stripping portion 102 is rotated through 360°. The blade(s) 702, which are preferably either straight edged, as shown in FIGS. 7–9, or disc-shaped, sever the perforated layer thereby enabling the severed layer to be removed from the end of the cable by applying traction thereto. The button 105 is again depressed to release the cable and the cable removed from the tool 100.

Figure 3:
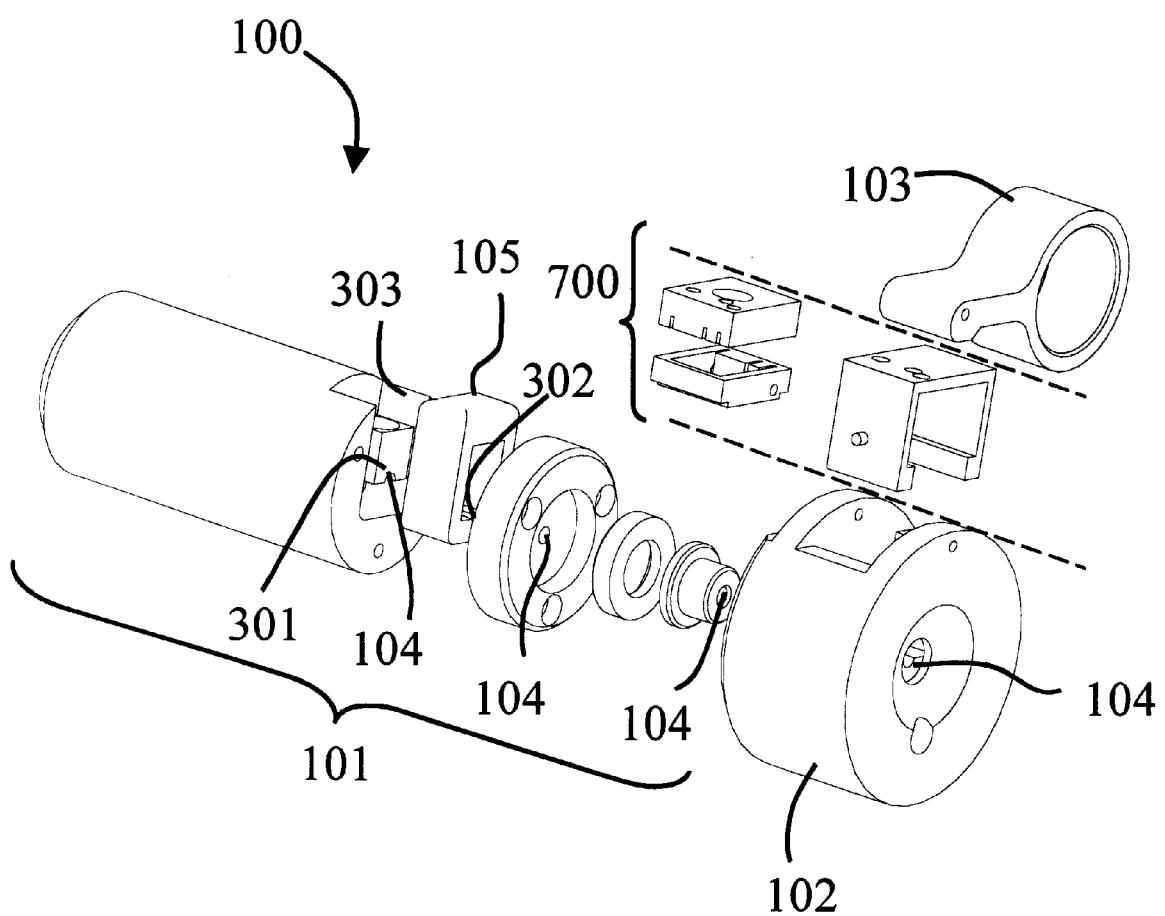
FIG. 3 is an exploded perspective view of the microcable stripping tool of FIGS. 1 and 2.

Turning now to FIG. 3, the tool 100 is illustrated in exploded perspective view. The springs in the gripping portion have been omitted from FIG. 3 for simplicity and clarity, but the position of the spring(s) in the gripping portion will be clear from the following discussion. The distal end of the axial bore 104 in the gripping portion 101 is split into two separable semicircular channels which, when juxtaposed, extend the axial bore 104. One half 301 of the axial bore within the distal end of the gripping portion is integral with the gripping portion. The other (opposing) half 302 of the distal end of the axial bore is disposed on the depressable button 105. When the button 105 is disposed within button recess 303, springs (not shown) disposed between the lower surface of button 105 and the gripping portion urge the separable halves 301 and 302 of the axial bore into juxtaposition. The diameter of that portion of the axial bore thus formed is slightly less than the diameter of the axial bore elsewhere within the gripping portion. Accordingly, when the button 105 is depressed and the halves separated, a cable may be advanced through the distal end of the axial bore. When the button is released, the separable halves of the distal end of the axial bore are urged against the cable thereby clamping it and preventing rotation of the cable within the axial bore as the stripping portion 102 is rotated.

Figure 4A:
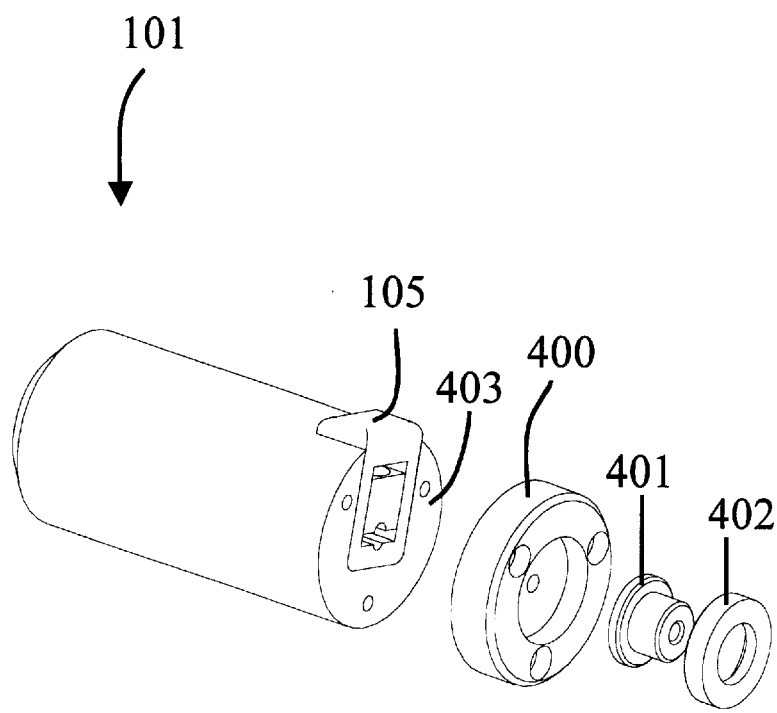
FIG. 4a is an exploded perspective view of the cable gripping portion of the microcable stripping tool of FIGS. 1 and 2.
Figure 4B:
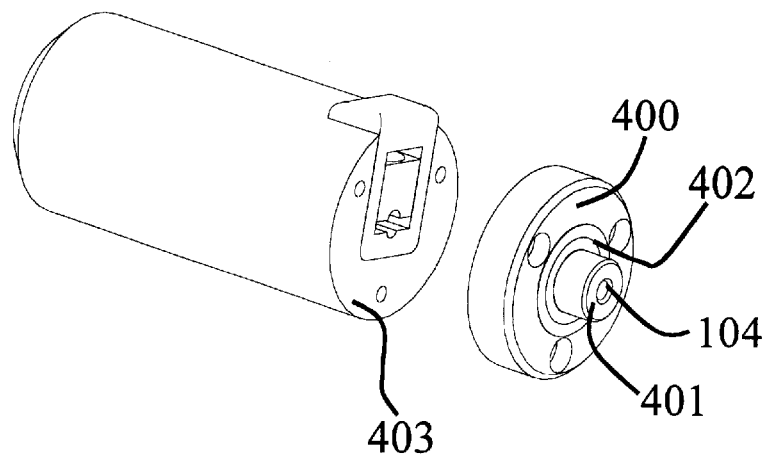
Figure 4C:
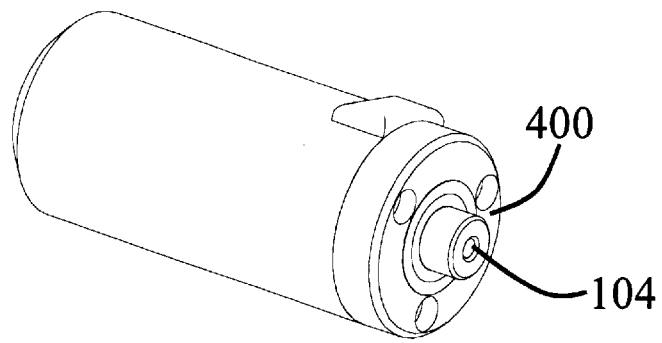
FIG. 4c is a perspective view of fully assembled cable gripping portion of the microcable stripping tool of FIGS. 4a and 4b.

The assembly of the gripping portion 101 is shown in FIGS. 4(a)–4(c). FIG. 4a shows, in exploded view, the gripping portion 101 with the clamping button 105 inserted within the button recess 303. A bushing 400 supports a cylindrical bearing 401 and a rotating member 402 within an inner diameter thereof. The bearing and rotating member are inserted into the inner diameter of bushing 400 and bushing 400 is attached to the gripping portion housing 403 by attachment means such as machine screws. The completely assembled gripping portion 101 of the microcable stripping tool 100 is illustrated at FIG. 4(c).

Figure 5:
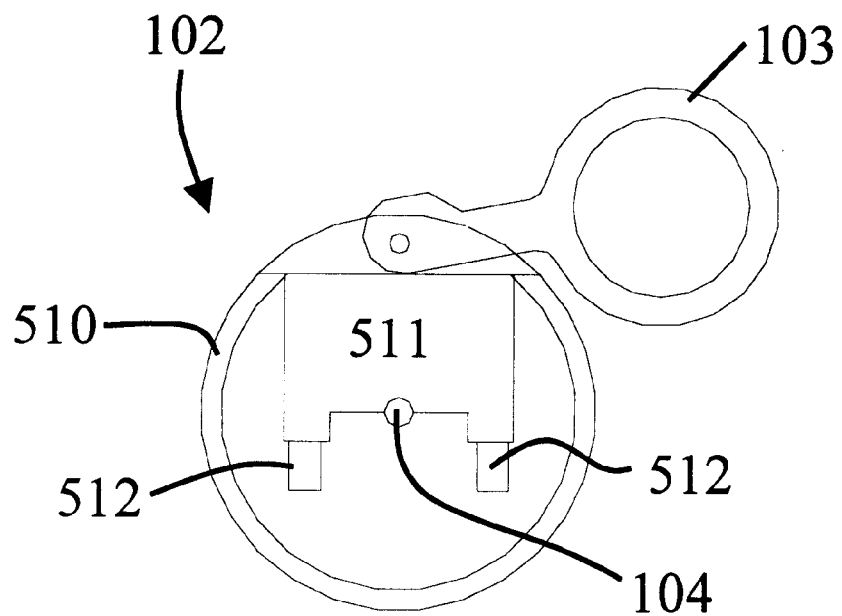
FIG. 5 is an end view of the rotatable blade assembly with the blades retracted.
Figure 6:
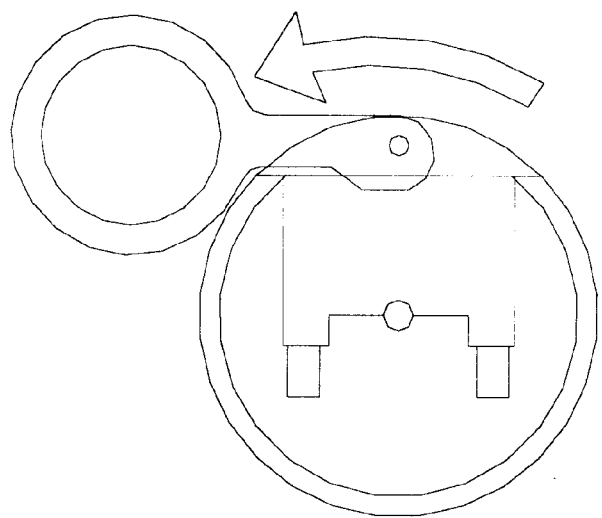
FIG. 6 is an end view of the rotatable blade assembly with the blades axially extended to cut into a layer of a microcoaxial cable (cable not shown).

The stripping portion 102 of the microcable stripping tool 100 is illustrated in end view in FIGS. 5 and 6. With reference now to FIG. 5, wherein the cam lever 103 is in a retracted position, the stripping portion 102 comprises a cylindrical body 510 providing support and pivotal attachment for cam lever 103. A blade cassette cavity 511 underlying cam lever 103 is dimensioned to receive, house and support a blade cassette 700 (FIGS. 7–9). The blade cassette cavity 511 includes spring cavities 512 which provide support for springs 701 (FIG. 7) which urge the blade cassette 700 upwardly until compressed by the cam lever 103 when the cam lever is moved to a stripping position, the direction of motion of cam lever 103 being indicated by the broad arrow shown in FIG. 6. When the cam lever is in the stripping position, as shown in FIG. 9, the blade(s) 702 comprising the blade cassette 700 are driven into a cable (not shown) to a depth sufficient to cut through the layer of the cable to be stripped. A subsequent 360° rotation of the stripping portion 102 around the axial bore 104 cuts an annular slit through the cable to the desired depth. The severed layer(s) can then be removed from the stripped end of the cable.

FIG. 7 shows a blade cassette 700 in transverse cross-sectional view. The blade cassette 700 is dimensioned to fit into blade cassette cavity 511. When the blade cassette 700 is disposed within cavity 511, the springs 701 are disposed within spring cavities 512 and urge the blade(s) 703 upwardly, away from the axial bore 104 within the stripping portion 102. The cam lever 103 controls the depth of extension of the blade(s) 702 into the axial bore 104. When the pivotally mounted cam lever 103 is partially rotated, the blade cassette travels inwardly in the axial direction as illustrated in FIG. 8. A 180° rotation of the cam lever 103 about its pivot point fully extends the blade(s) 702 into the cable layer(s) and locks the cam lever in the depressed position, with the blade(s) comprising the blade cassette fully extended into the axial bore as illustrated in FIG. 9. Subsequent rotation of the stripping portion 102 through 360° severs the respective layers enabling removal of the severed layers from the stripped end of the cable.

The objective of the present invention is met by the stripping tool presented and described hereinabove. The stripping tool of the present invention is operable for stripping one or more layers of material from an end of a microcoaxial cable in preparation for the attachment of a coaxial cable connector thereto. The term "microcoaxial cable" refers to coaxial cables having a plurality of concentric, coaxial layers of material and an outer diameter that is 4 millimeters or less. The tool comprises an elongate, substantially cylindrical body having a length and an axial bore coextensive with the length. The diameter of the axial bore is slightly greater than the outer diameter of the microcoaxial cable, thereby permitting the end of the cable to be stripped to be inserted into the axial bore and advanced therethrough. The elongate body, which may be made from any rigid material, comprises a substantially cylindrical gripping portion having a proximal end and a distal end. The gripping portion includes spring loaded cable clamping means operable for releasably gripping the microcoaxial cable when the cable is disposed within the axial bore to prevent rotation of the cable during the stripping process. The tool further comprises a stripping portion rotatably mounted on the distal end of the gripping portion. The stripping portion includes at least one blade, and most preferably three blades, having a cutting edge mounted on the stripping portion that is reciprocally movable. Hand-operable blade actuator means on the stripping portion extends the blade(s) into the axial bore to a desired depth thereby cutting through one or more layers of the cable to a desired depth. When the blade(s) are fully extended, the stripping portion is then rotated through 360° to cleanly sever the material connection between the desired layer or layers and the cable. The cable is then removed from the axial bore of the tool. In an embodiment of the stripping tool, the stripping portion includes a retractable tubular sleeve at the distal end of the axial bore that enables the stripped portions of the microcoaxial cable to be removed from the axial bore of the tool.

It will be recalled that, as discussed earlier, when prior art hand operable cable stripping tools are used to strip small diameter, less rigid cables, the resultant cut is unprecise for two reasons: (a) the cable is ususally secured with the cable installer's hands some distance from the rotating tool's cutting blades, resulting in the microcable's rotation off-axis as the circular force is applied some distance from the fixed point of the cable (i.e., the point at which the cable is grasped) which causes "wobbling" and an uneven cut depth; and (b) when the multiple blades are inserted into the cable at differing depths and then rotated, the resistance of the deep cutting blade becomes greater than the shallower cutting blades. This causes the cable to flex, or twist and rotate off its axis during the cutting rotation, resulting in unequal cutting. The lack of precision in a cut due to the first reason (i.e., reason (a)) is solved by positioning the cable holding clamp (i.e., the cable clamping means) close to the cutting blades. The second limitation (i.e., reason (b)) of prior art cable strippers, when used to strip a microcoaxial cable, is overcome by the retractable guide tube disposed distal to the cutting blade which serves to hold the cable in alignment with it's longitudinal axis throughout rotation of the cutting portion.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What we claim is:

1. A hand operable stripping tool operable for stripping one or more layers of material from an end of a microcoaxial cable having a plurality of concentric, coaxial layers of material and an outer diameter, the tool comprising an elongate body having an axial bore coextensive with a length thereof and a diameter greater than the outer diameter of the microcoaxial cable, the elongate body comprising: (a) a substantially cylindrical gripping portion having a proximal end and a distal end and cable clamping means therebetween operable for releasably gripping the microcoaxial cable when the cable is inserted into said axial bore; (b) a stripping portion movably mounted on said distal end of said gripping portion to rotate around said axial bore; and (c) at least one blade having a cutting edge mounted within said stripping portion and reversibly extendable into said axial bore.

2. A hand operable stripping tool in accordance with claim 1 wherein said cable clamping means further comprises a spring disposed within said gripping portion operable for urging said cable clamping means against a cable disposed within the axial bore.

3. A hand operable stripping tool in accordance with claim 2 wherein said stripping portion further comprises blade positioning means operable for extending said blade into said axial bore and retracting said blade from said axial bore.

4. A hand operable stripping tool in accordance with claim 1 wherein said stripping portion further comprises blade positioning means operable for extending said blade into said axial bore and retracting said blade from said axial bore.

* * * * *